(12) United States Patent  (10) Patent No.: US 8,407,316 B2
Harrington  (45) Date of Patent: Mar. 26, 2013

(54) SYSTEM AND METHOD FOR MANAGING A PRINT JOB IN A PRINTING SYSTEM

(75) Inventor: Steven J Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1182 days.

(21) Appl. No.: 12/261,129

(22) Filed: Oct. 30, 2008

(65) Prior Publication Data

US 2010/0110473 A1  May 6, 2010

(51) Int. Cl.
*G06F 15/16* (2006.01)

(52) U.S. Cl. .......................................... 709/219; 358/1.1

(58) Field of Classification Search ................... 709/219; 358/1.1–1.6
See application file for complete search history.

(56) References Cited

U.S. PATENT DOCUMENTS

| | | | |
|---|---|---|---|
| 6,925,538 B2 | 8/2005 | Niwa et al. | |
| 6,954,278 B1* | 10/2005 | Cronch et al. | 358/1.15 |
| 6,965,938 B1 | 11/2005 | Beasley | |
| 7,187,465 B2* | 3/2007 | Keane et al. | 358/1.15 |
| 7,228,343 B2 | 6/2007 | Sanders | |
| 7,243,225 B2 | 7/2007 | Poeluev et al. | |
| 7,283,264 B2* | 10/2007 | Parry | 358/1.15 |
| 7,284,246 B2 | 10/2007 | Kemp et al. | |
| 7,308,645 B2 | 12/2007 | Humpleman et al. | |
| 7,581,229 B2 | 8/2009 | Watkins et al. | |
| 7,600,050 B2 | 10/2009 | Aritomi | |
| 7,802,306 B1 | 9/2010 | Adams et al. | |
| 2001/0041991 A1 | 11/2001 | Segal et al. | |
| 2002/0152296 A1 | 10/2002 | Baker | |
| 2003/0005100 A1 | 1/2003 | Barnard et al. | |
| 2003/0014368 A1* | 1/2003 | Leurig et al. | 705/64 |
| 2003/0061489 A1 | 3/2003 | Pelly et al. | |
| 2003/0093525 A1 | 5/2003 | Yeung et al. | |
| 2004/0025165 A1 | 2/2004 | Desoli et al. | |
| 2004/0145601 A1 | 7/2004 | Brielmann et al. | |
| 2004/0179103 A1 | 9/2004 | Endo et al. | |
| 2005/0078332 A1 | 4/2005 | Brown | |
| 2005/0120082 A1 | 6/2005 | Hessalink et al. | |

(Continued)

OTHER PUBLICATIONS

U.S. Appl. No. 12/145,591—Prosecution History as of Jan. 26, 2012 for U.S. Appl. No. 12/145,59, filed Jun. 25, 2008, Published Dec. 31, 2009, as US 2009-0327456 A1; Inventor: Tredoux.

(Continued)

*Primary Examiner* — David Lazaro
*Assistant Examiner* — Marie Georges Henry

(57) ABSTRACT

There is disclosed a system and method of processing a document converted, by a print driver, from a first format to a second format. The system includes a workstation with a browser communicating with both a user interface (having a display) and a network. The browser is used to access a services interface, the services interface including at least one selectable service available by way of the network. The browser, responsive to the print driver converting the document in the first format into the document in the second format, is opened to display the at least one selectable service of the services interface on the user interface display. Responsive to selecting the at least one selectable service from the displayed services interface, the at least one selectable service is applied to the document corresponding in the second format.

25 Claims, 3 Drawing Sheets

U.S. PATENT DOCUMENTS

| | | | |
|---|---|---|---|
| 2005/0185211 A1 | 8/2005 | Foehr et al. | |
| 2005/0270587 A1 | 12/2005 | Yamakawa et al. | |
| 2006/0031327 A1 | 2/2006 | Kredo | |
| 2006/0059340 A1 | 3/2006 | Eldenmalm et al. | |
| 2006/0059462 A1 | 3/2006 | Yamamoto | |
| 2006/0085852 A1 | 4/2006 | Sima | |
| 2006/0146356 A1 | 7/2006 | Yang | |
| 2006/0179413 A1 | 8/2006 | Eifler et al. | |
| 2007/0033408 A1 | 2/2007 | Morten | |
| 2007/0097423 A1 | 5/2007 | Kawano | |
| 2007/0127050 A1 | 6/2007 | Iwata et al. | |
| 2007/0159663 A1 | 7/2007 | Tsujimoto | |
| 2007/0165276 A1 | 7/2007 | Nakashima | |
| 2007/0174429 A1 | 7/2007 | Mazzaferri et al. | |
| 2007/0236717 A1 | 10/2007 | Nishikawa | |
| 2008/0091800 A1* | 4/2008 | Sorrentino et al. | 709/219 |
| 2008/0180725 A1* | 7/2008 | Levin | 358/1.15 |
| 2008/0276297 A1 | 11/2008 | Shay | |
| 2009/0225349 A1 | 9/2009 | Hirai | |
| 2009/0225366 A1 | 9/2009 | Emori | |
| 2009/0327456 A1 | 12/2009 | Tredoux | |
| 2010/0110472 A1 | 5/2010 | Harrington | |
| 2011/0090528 A1 | 4/2011 | Harrington | |

OTHER PUBLICATIONS

U.S. Appl. No. 12/580,854—File History as of Jan. 26, 2012 for U.S. Appl. No. 12/580,854, filed Oct. 16, 2009, Published Apr. 21, 2011, as US-2011-0090528-A1; Inventor: Steven J. Harrington et al.

U.S. Appl. No. 11/801,029—Prosecution History as of Jan. 30, 2012 for U.S. Appl. No. 11/801,029, filed May 8, 2007, Published Apr. 17, 2008, as US 2008-0091800 A1; Inventor: Sorrentino.

U.S. Appl. No. 12/261,120—Prosecution History as of Mar. 27, 2012 for U.S. Appl. No. 12/261,120, filed Oct. 30, 2008, Published May 6, 2010, as US-2010-0110472-A1; Inventor: Steven J. Harrington.

Reference is made to commonly-assigned copending U.S. Appl. No. 12/261,120, filed concurrently herewith, entitled "System and Method for Managing a Print Job in a Printing System", by Steven J. Harrington.

Prosecution History Between Feb. 1, 2012 and Jul. 11, 2012 for U.S. Appl. No. 12/580,854, filed Oct. 16, 2009, Published Apr. 21, 2011, as US-2011-0090528-A1; Inventor: Steven J. Harrington et al.

U.S. Appl. No. 11/801,029—Prosecution History Between Jan. 31, 2012 and Jun. 7, 2012 for U.S. Appl. No. 11/801,029, filed May 8, 2007, Published Apr. 17, 2008, as US 2008-0091800 A1 ; Inventor: Sorrentino.

* cited by examiner

SYSTEM AND METHOD FOR MANAGING A PRINT JOB IN A PRINTING SYSTEM

CROSS-REFERENCE TO RELATED APPLICATIONS

Reference is made to commonly-assigned copending U.S. patent application No. 12/261,120, filed concurrently herewith, entitled "SYSTEM AND METHOD FOR MANAGING A PRINT JOB IN A PRINTING SYSTEM", by Steven J. Harrington, the disclosure of which is incorporated herein.

BACKGROUND AND SUMMARY

The disclosed embodiments relate generally to an approach for managing a print job in a networked printing system and, more particularly, to an approach in which custom services can be added to a print job pursuant to its submission to a printer from a client workstation.

In the area of digital printing and copying, there has been a growth in demand for multifunction electronic printing devices (MFD). Such devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. Because of their network transmission capabilities combined with their functionality, it is useful for MFDs to be able to utilize web browsers to access information from the World Wide Web and various document devices present on the LAN to which the MFD is connected.

U.S. Patent Application Publication No. 20080091800 to Sorrentino et al. (published on Apr. 17, 2008 and entitled "Local User Interface Support of Remote Services") discloses a number of prior art implementations for accessing web content on a MFD. More particularly, Publication No. 20080091800, the pertinent portions of which are incorporated herein by reference, discloses a MFD enabling access to both services resident on the MFD and remote services through a user interface that processes digital documents through use of a Web browser. The MFD includes a browser for requesting and viewing external web applications pages on the local user interface of the MFD for remote service(s) running in the browser and for transmitting system events to remote service browser page(s). The MFD also includes a local applications service, which controls services resident on the MFD, and a local user interface, which permits local and remote systems to interrogate and control the MFD. Web services provide application programming interface(s) capable of utilizing a plurality of web protocols.

Xerox Corporation ("Xerox") and Canon USA, Inc. each currently offer a platform permitting the introduction of custom services on the interface panel of an MFD (hereinafter referred to as "the custom services platform"). For example, each currently offered custom services platform can be used to offer special scanning or copying services at the MFD. Thus, the typical custom services platform includes a copy path. However, as understood, the focus of these custom services platforms has not been on print path development.

In accordance with one aspect of the disclosed embodiments there is disclosed a print job processing system, including a workstation communicating with a network. The workstation includes a document application for creating a document in a first format, a print driver, communicating with the document application, for converting the document in the first format into a document in a second format, a user interface with a display, a browser, communicating with the user interface and the web service, for accessing a services interface, the services interface including at least one selectable service available by way of the network. The browser, responsive to the print driver converting the document in the first format into the document in the second format, is opened to display the at least one selectable service of the services interface on the user interface display. Responsive to selecting the at least one selectable service from the displayed services interface, the at least one selectable service is applied to the document in the second format to form the print job.

In accordance with another aspect of the disclosed embodiments there is disclosed a method of processing a print job. The method includes:

A. performing the following with a workstation: (1) creating a document in a first format, (2) using a print driver to convert the document in the first format into a document in a second format, (3) accessing a services interface with a browser, the services interface including at least one selectable service available by way of the network, (4) responsive to said A(2), opening the browser to display the at least one selectable service of the services interface on a user interface display, and (5) selecting the at least one selectable service from the displayed services interface; and B. responsive to A(5), causing the at least one selectable service to be applied to the document in the second format to form the print job.

BRIEF DESCRIPTION OF THE DRAWINGS

The foregoing and other features of the embodiments described herein will be apparent and easily understood from a further reading of the specification, claims and by reference to the accompanying drawings in which:

DESCRIPTION OF DISCLOSED EMBODIMENTS

While for the purposes of explanation the method and system will be described as functioning within a network including various printing and communication devices, it will be appreciated by those skilled in the art that accessing remote services on a local user interface through use of a Web browser may be beneficially utilized in any communication environment which requires a secure hard copy of a facsimile confirmation. All such variations and modifications are fully contemplated by the scope of the specification and claims herein.

Various computing environments may incorporate capabilities for accessing remote services on a local user interface through use of a Web browser. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 1:
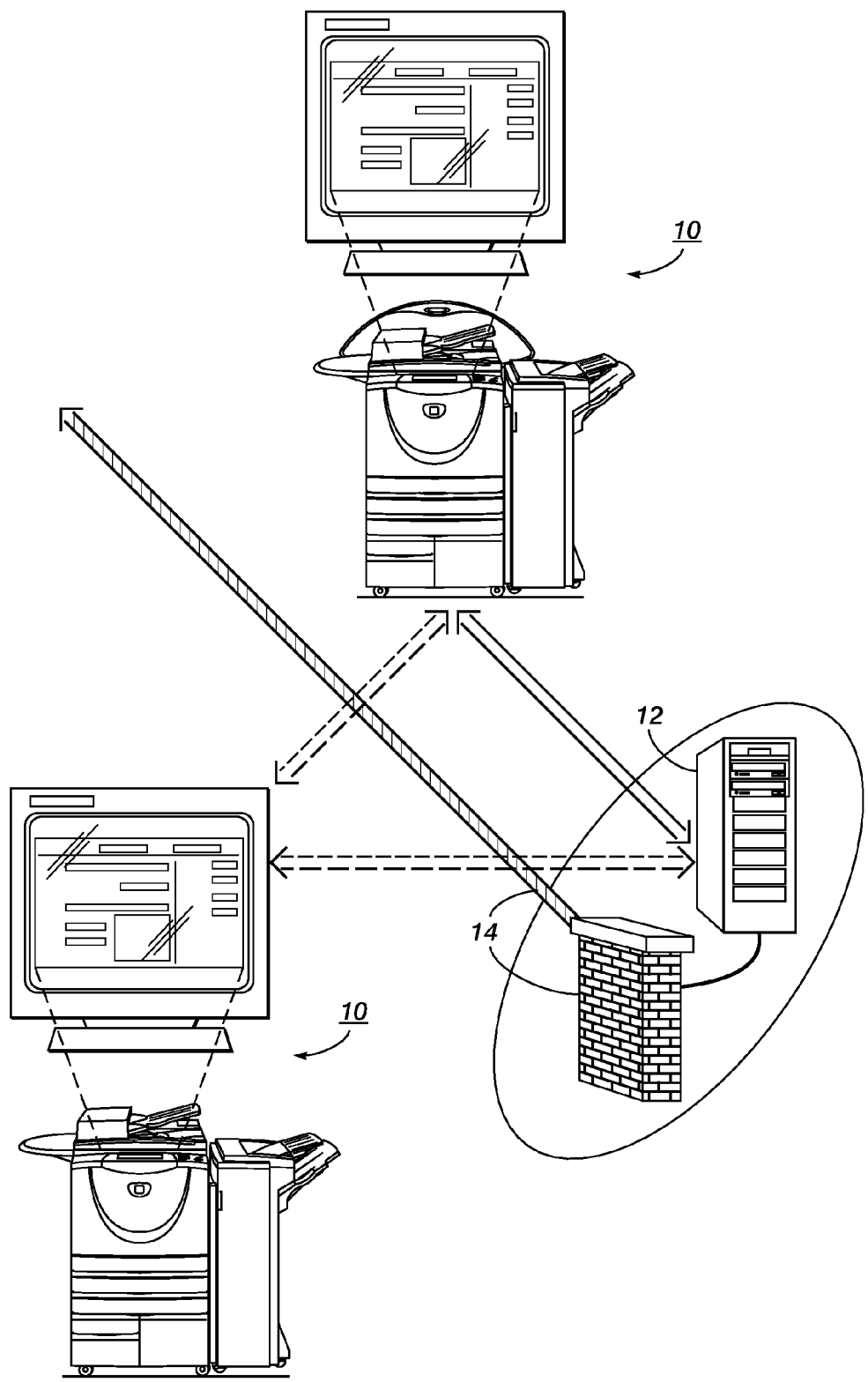
FIG. 1 is a schematic illustration of one embodiment of a custom services platform providing local user interface support for remote services.

Referring to FIG. 1, the block diagram illustrates an example embodiment of a system that provides local user interface support for remote services, such as accounting packages, document repositories, billing applications, medical record services, etc. In other words, services that execute on computers external to the MFD, that are provided by companies other than Xerox, but do not exclude services provided by Xerox. The network environment may also contain various multifunction devices ("MFDs") 10, an application server 12 for hosting remote services, and various other devices, such as personal computers, printer servers, printers, etc., all connected to network 14 with access to the internet. While for the purposes of brevity of description the method and system are described as utilizing a graphical user interface present on the MFD 10, such access may be accomplished by a user interacting with the MFD user interface and invoking a remote service at the local user interface.

The MFD 10 may be a standalone device or may form part of a network including various printer and copying devices. MFD 10 may be any device capable of scanning image material. The scanned image may be in various formats, for example, but not limited to, PDF (portable document format), TIFF (tag image file format), JPEG (joint photographics experts group format), GIF (graphics interchange format), or BMP (BitMaP). In addition to scanning and transmitting the scanned image via electronic mail, MFD 10 may also include functionality for printing, copying, or transmitting facsimile images. Operation of MFD 10 is controlled from a user interface, which enables a user to select the function to be performed as well as enter information required by the device to perform an operation. Typically buttons or a keypad are utilized to enter information and select functionality, but a touch screen or any other means known in the art may be utilized. The user interface may be customized to reflect the document processing needs of the operator or the operator's organization.

Additionally, third parties with preexisting solutions or third parties that can customize existing applications may be contacted through the interface. These remote service solutions may be in the form of software and hardware solutions to extend the base functionality of the MFD. The remote services solutions may be produced for specific customers or produced as generic products for any interested party. Application server 12 hosts the web applications that may appear on the local user interface of the MFD. The web applications hosted on the server 12 may be registered with several MFDs and accessed via the local user interfaces of those MFDs.

All these main components are coupled together via network 14. The system and method herein are not limited to a particular type of network system. Typical network interfaces include general-purpose systems such as POTS (plain-old telephone systems) and ISDN (Integrated Services Digital Network), as well as special-purpose systems such as a LAN (Local Area Network) or a WAN (Wide Area Network). Such networking environments are commonplace in offices, enterprise-wide computer networks, intranets and the Internet. Those skilled in the art will appreciate that the principles of the system and method described herein can be applied to virtually any network system without departing from the scope of the claims and specification.

Further structural and functional aspects of the exemplary system of FIG. 1 are described and/or illustrated in U.S. Patent Application Publication No. 20080091800 to Sorrentino et al.

Figure 2:
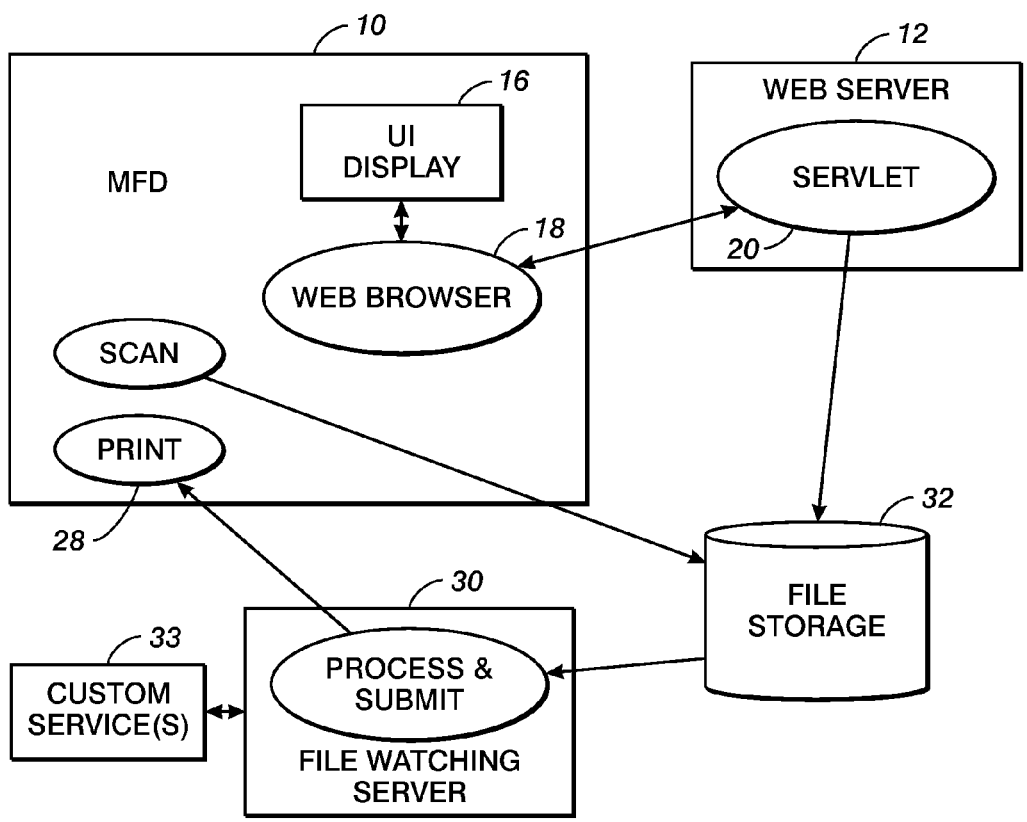
FIG. 2 is a schematic illustration in which the custom services platform is implemented in a copy path configuration.

Turning now to FIG. 2, one of the concepts underlying the custom services platform is to provide an approach in which at least one custom service application can be added to an MFD 10. To do this, the MFD UI display 16 is actually driven by a web browser 18, and the UI pages displayed are actually web pages. The custom service platform allows third parties to register a URL for a welcome page of a custom service. This page then becomes available through the MFD's UI. Once the welcome page for the custom service is displayed, it can interact with servlets (such as servlet 20) on web servers (such as web server 12) just as any other browser-based application. HTML forms on the web pages can gather user input and submit it to the servlets. Servlets can carry out computations and can interact with the MFD either through the UI pages it generates, or by submission of files such as print jobs. Software supporting the custom services platform may include a set of widgets and style sheets tailored to the device UI. Each device loads its own version of these components, so that if the UI is constructed from these components, it will be portable across devices, even though their actual displays and buttons may change.

Referring still to FIG. 2, the custom services platform may also provide some web services that can be called by JavaScript running on the browser 18, or by the servlet 20. In one contemplated approach, the servlet 20 is communicatively associated with a list of services or application. An example of a web service function may include the initiation of a scan. With this, an application could, for instance, imitate a scan, provide some image processing on the scanned image, and then submit it to a printer 28, in order to create a custom scanning feature. For a scanning application like this, one might separate the interactive gathering of information at the UI, from the image processing of the scanned image. One might in fact have a service 30 that watches for scanned files to appear (at, for instance, file storage 32) in order to process and print them. Thus there may be two services running, one a web service to handle the interaction with the user, and the file watching service 30 to watch for and to process files that are generated by scanning. Additionally, one or more custom services (labeled with the numeral 33 in FIGS. 2 and 3) may share files with file watching service 30.

While the custom service platform of FIG. 2 allows the introduction of custom services initiated from the MFD UI, it does not address custom services that might be applied to print files submitted from a user's workstation. At first blush, the application of custom services to print files may seem fairly straightforward. Following the teaching above, instead of using the web browser to drive the MFD UI, the web browser on the user's workstation would be used to drive the web browser. However, the browser invocation above is not suitably integrated into the print submission process. Print submission occurs in two steps leading to at least two points where the custom services interface could be inserted.

Figure 3:
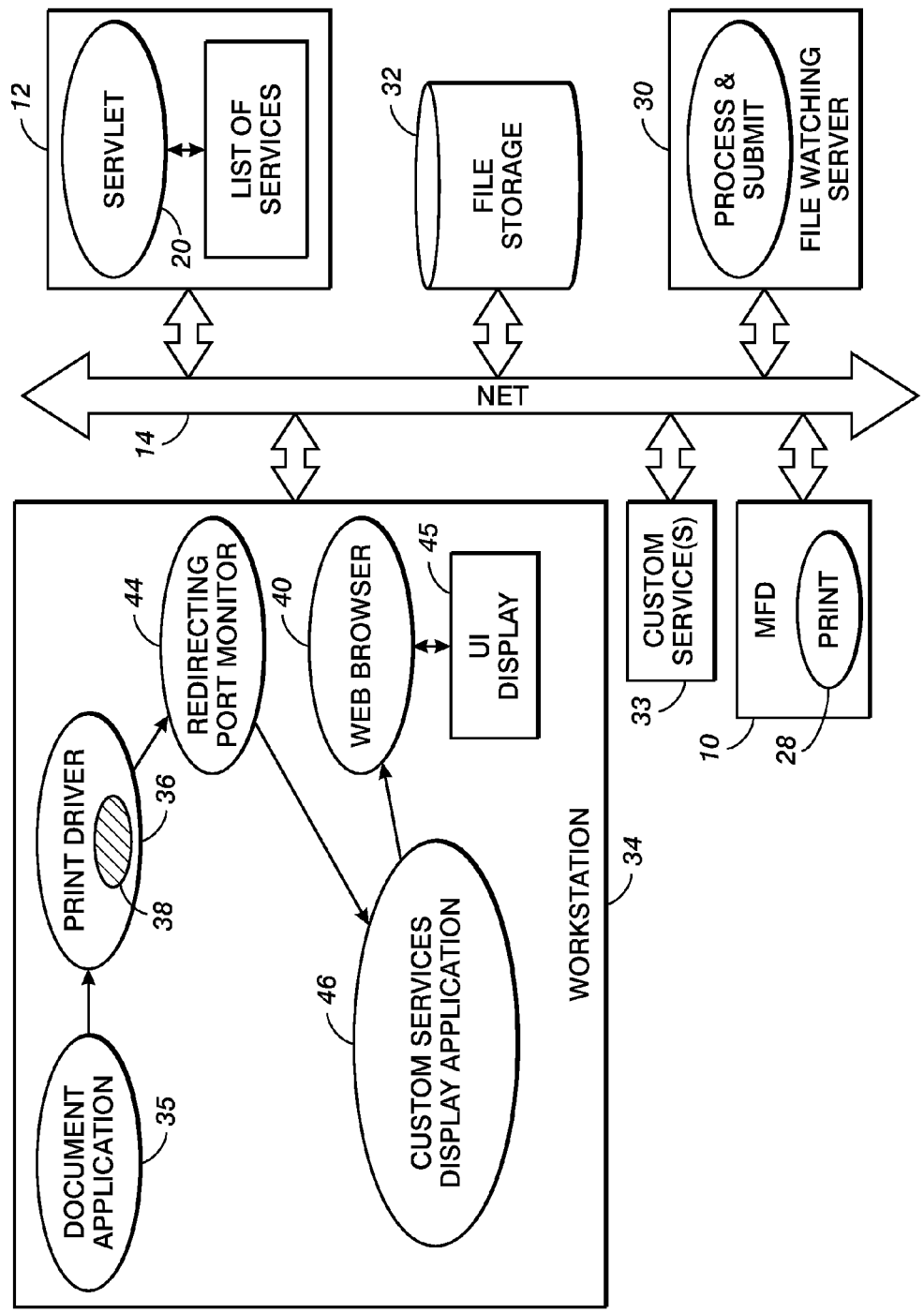
FIG. 3 is a schematic illustration in which the custom services platform is implemented in a print path configuration.

Referring to FIG. 3, when a print operation is requested in a document application a call is made to the print driver 36. The print driver converts a document (provided, in one example, from a document application 35) from its internal format to a document format suitable for printing (such as PostScript or PCL). The print driver may also specify job parameters that a printer can use (such as paper size or orientation). The converted document may then be sent to a printer 28 (which may be part of MFD 10) or print server (not shown). This is the task of the port monitor (also known as a print monitor).

Referring still to FIG. 3, a client workstation 34 is shown communicating with various components of FIG. 2 by way of the network 14. One approach for including custom services in a print path would be to include a custom services button 38 in a print driver 36. As should be understood a "custom service," as contemplated herein, may include not only a web service, but any other service on the network 14. Responsive to activation of this button, a client web browser 40 is opened for displaying a custom services interface. When the browser is closed, a return to the print driver for completing the print submission may occur.

In another approach, a redirecting port monitor may be used to include custom services in the print path. In this second approach a special pseudo printer is registered that includes the print driver 36 (without the button 38) and a redirecting port monitor 44 (available, for example, the Redmon open-source redirecting monitor software, available under a GNU general public license). The print driver 36 may convert a print file and hand it off to the port monitor 44, but the port monitor, instead of sending the file to a printer 28, may then call a custom services display application 46. The application, in turn, may open the browser 40, call a custom-service selection web page (from the web server 12), and perhaps copy the print file to a desired storage location on file storage 32.

In a fleet of office machines, some devices or components may possess large UI display panels while others may possess small ones; some may have color displays while others may have monotone. In the environment of the custom services platform, a mechanism would be useful for adjusting UI layout and style to provide compliance among the various display devices available on different products. With the exemplary platform of FIG. 2, this mechanism may be implemented by loading two files directly from the MFD. These are a JavaScript file that defines the widgets and a style sheet that defines the styles. When extending the process to print submission, this mechanism has been found unsuitable because the browser 18 (FIG. 2) displaying the UI is not on the user's workstation, and the user does not have local versions of the widgets and styles for the client workstation 34. One approach found to work in print submission includes defining generic widget script and style sheet files and to store copies of them on the web (possibly with web server 12) such that they can be referenced by the custom services interface. The custom services UI server pages may then be adapted to include tests that would detect the loading of local copies of the widget and style sheet files. Thus when a service is requested from an MFD, the commands to load local versions of the widget definitions and styles would proceed as normal, and when it is discovered, with the test, that they have been loaded, no further loading is required. However, when the service is accessed from the browser 40, the attempt to load local files would fail because the workstation doesn't have them. The test for their presence would detect this failure and in response, would load copies of the generic versions on the client workstation from the web server 12.

When using the custom services platform of FIG. 2, it is desirable to register custom services with each device that will present them. Once registered, a given device UI will provide a list of custom services (or all services) for selection and invocation by the user. For services invoked from the printing process (FIG. 3), the invoking device is the user's workstation which does not necessarily have a registration or service selection mechanism. Accordingly a new service-selection service that is available from the workstation 34 (FIG. 3) is created. This service is entered as the default URL when the user's web browser is called. Thus, when the redirecting port monitor 44 opens a browser window, the first page displayed on a UI display 45 shows the selection of available services. When a selection is made, the selection service transfers control to the desired choice. Instead of (or in addition to) registering a new service with each device where it will be presented, the new services can be added to (registered with) the service-selection service. Note it is possible to have multiple instances of the service-selection service, each with its own particular set of custom service choices, and each available via its own URL. The set of choices presented to the user via the print path would then depend upon which instance of the service-selection service was set up as the initial page for the web browser 40.

For the custom services platform of FIG. 2, when a service completes, a web service call can be made to the MFD 10 to return control to normal device operation. This causes the custom service UI page to be replaced by one of the standard device UI pages and interaction with the custom service is terminated. When the interaction is with the browser 40 on the user's workstation 34 (FIG. 3), however, there is no web service to terminate the interaction and there is no standard device UI to return to. When operating relative to the print path embodiment, it would be desirable to close the web browser 40 and thereby indicate to the custom services display application that the user interaction is complete and the print file processing can proceed. At one time, JavaScript code could automatically close the browser window but, as understood, that was later seen as inappropriate. The Firefox browser appears to only allow a JavaScript routing to close a window that it has opened, and Internet Explorer requires user confirmation for closing. An approach of the disclosed embodiments is to display a web page with a message to the user indicating that the user should close the window to proceed. This serves to complete the custom service interaction.

In constructing an application suitable for use with custom services platforms of FIGS. 2 and 3 (for either copying or printing), the issue of dealing with different file formats that can occur from the copy and print paths may arise. The copy path produces a scanned image in a raster image format such as TIFF or possibly a raster image within a document format such as PDF. The print path typically produces a document in PostScript or PCL format, depending on the print driver. The acceptability of format depends upon the actual custom service, but as a general rule, for services that apply to both printing and copying, the print format can be first decomposed to a raster by software such as the open-source Ghost-Script rasterizer, and then handled in the same way as the scanned rasters of the copying case. Since document file formats are typically self identifying, the custom service platform of FIG. 3 can be provided with the capacity to determine from the document itself whether such conversions are needed.

There are a couple of places where the logical behavior of the custom services platform depends upon whether the print path or copy path is being processed. Referring to FIGS. 2 and 3, one example occurs when exiting from a service interaction. In the case of the copy path, a web service call may be made to return control to the MFD, whereas in the case of the print path, the web browser 40 may be closed. A second place where the behavior differs is in the initiation of the document acquisition. In the copy case, the custom service must send a web-service call to the MFD to initiate scanning. In the case of printing, the handling of the print file may be conveyed back to the workstation 34. The two cases may be distinguished by adding a parameter to the URL when the service is called from the custom services display application 46 on the user's workstation 34. This parameter is thereby passed to the service selection service, and then on to a selected service(s). The presence of this parameter indicates that the call came from the print path; its absence indicates that the service was initiated from the MFD as a copy function. The parameter used may comprise a unique print job identifier (PrintID) that can be used for coordination between the custom service and the custom services display application as described below.

When a custom service initiates scanning at the MFD (FIG. 2), it may specify a scan template. One of the scanning parameters in the template may include the destination of the scanned image file. For the print path, a mechanism may be provided to permit a custom service to apprise the custom service display application 46 where it can expect to find a given document file to be printed. In one example this can be achieved with a tracking mechanism, such as a "cookie" mechanism. While the scan case may execute JavaScript code to call the scanning web service, the print case may execute JavaScript code to write a [Web] cookie. The PrintID parameter described above may then be used to identify the cookie as belonging to this particular custom service interaction. The cookie may be given a short lifetime, since it will only be used for this interaction instance. The data in the cookie includes the print file destination desired by the custom service, and the expected naming pattern for the file. Since he custom service display application 46 generated the PrintID, the custom service display application 46 (FIG. 3) knows what to watch for in the cookie file. This application can watch for the desired cookie to appear and when it does so, it can then begin transfer of the print file. Note the cookie might also express other options, such as indicating that the print file is not needed and should be discarded. The cookie could also indicate that other processing should be done by the user's workstation. The cookie might also indicate other information gathered from the user during the web browser interaction, such as which printer or printers should be the final destination of the document.

Alternatively, the location of the document to be printed, and/or other information may be provided via a web service (associated with the web server 12 of FIG. 2 or 3). A custom service can deposit the information to be conveyed (such as where it would expect to find a print file) in a temporary storage element such as a file. The web service could then be used to examine the stored information and deliver it to a querying entity. The custom service display application can query the web service for the desired print file storage location and proceed to store the file at that location. As in the cookie case, other information such as print file handling, additional processing by the workstation, or final printer destination, can also be transferred to the custom service display application by means of the web service. An identifier such as the PrintID can be used by the web service to match the request to a particular information deposit. This approach may be preferred over the cookie approach because it does not depend upon particular browser mechanisms for storage of cookies.

When the MFD 10 (FIG. 2) scans a document it may actually produce two files. One file contains the scanned document digital image, and the second file contains metadata about the scan. Since some of this metadata is sometimes used by custom services, it is desirable to also produce a metadata file for the printing case. The metadata file for the printing case may, in some instances, only contain the subset of values that make sense for the printing process, and not all of the items that are present for the scanning case. The metadata file, for the printing case, might also be extended to include metadata that is only appropriate to printing.

Referring again to FIG. 3, it is contemplated that a print job ready for printing with the printer 28 could be communicated to the printer or print server (from the file storage 32) via file watching service 30. In a first example, a print job (including image data and metadata files) would be buffered or stored at the file watching service 30 for eventual delivery to the printer 28. In a second example, a document in a printable format (for application of a selectable custom service thereto) could be stored at the file watching service 30 in anticipation of further processing in the custom services platform. In the second example, the file watching service would forward the document in the printable format to the custom service. After performing its processing, the custom service could then forward the processed print job to the printer. In a third example, the file watching service could forward the document in the printable format to the custom service and receive the processed print job back from the custom service after the custom service has processed it. The file watching service would then forward the processed print job to the printer. As will be appreciated by those skilled in the art, the functionality of the file watching service 30 could be integrated with any one or more of the custom services. In this way, a print job could be transmitted directly from a custom service (with file watching capability) to a printer or print server.

Based on the above description, the following should now be apparent from the disclosure above:

A system and method of processing a document converted, by a print driver, from a first format to a second format. The system includes a workstation with a browser communicating with both a user interface (having a display) and a network. The browser is used to access a services interface, the services interface including at least one selectable service available by way of the network. The browser, responsive to the print driver converting the document in the first format into the document in the second format, is opened to display the at least one selectable service of the services interface on the user interface display. Responsive to selecting the at least one selectable service from the displayed services interface, a custom service applies the at least one selectable service to the document corresponding in the second format.

The print job processing system may further include a file watching service communicating with the network. In one example, the document in the second format is transmitted from the file watching service to a custom service for application of the at least one selectable service thereto. The print job processing system may further include a file storage communicating with the network, so that the document in the second format may be transmitted from the file storage to the file watching service. The print job processing system may yet further include a file storage communicating with the network, so that the document in the second format with the at least one selectable service applied thereto may be transmitted from the custom service to a printer for printing.

In another example, the document in the second format with the at least one selectable service applied thereto (i.e., print job) is transmitted to said file watching service for buffering of the document in the second format. In turn, the document in the print job may be transmitted from the file watching service to said printer for printing.

The print job processing system may further include a browser activating system for causing the browser to be opened to display the at least one selectable service of the services interface on said user interface display, as well as a printer communicating with the network and corresponding with a destination. The browser activating system may be apprised of the printing destination.

In one example, the browser activating system may be apprised with a file including a print identification—the file may comprise a cookie. In another example, the browser activating system may be apprised with information stored on the network, and the information may be delivered to the browser activating system by a custom service.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A print job processing system, comprising:
a workstation communicating with a network;
a custom service communicating with the network; and
said workstation including,
  a document application for creating a document in a first format,
  a print driver, communicating with said document application, for converting the document in the first format into a document in a second format,
  a user interface, said user interface including a display and a user input device, and
  a browser, communicating with said user interface and said custom service, for accessing a services interface associated with said custom services, the services interface including selectable services of said custom service,
  said browser, responsive to said print driver converting the document in the first format into the document in the second format, being launched so as to display the selectable services of said custom service in the services interface on said display;
a file watching service communicating with the network;
said file watching service buffering the document in the second format;
said file watching service, responsive to selecting, though said user input device, one of the selectable services displayed in the services interface, transmitting the document in the second format to said custom service;
said custom service applying the selected selectable service to the document in the second format to form a print job;
said file watching service buffering the print job;
said file watching service transmitting the buffered print job to a printer for printing.

2. The print job processing system of claim 1, wherein the printer has a printing destination; and said browser is apprised of the printing destination.

3. The print job processing system of claim 1, further comprising a web service, wherein information regarding the printing destination is delivered to said browser by said web service.

4. A print job processing system, comprising:
a workstation communicating with a web service by way of a network;
a custom service communicating with the network; and
said workstation including,
  a document application for creating a document in a first format,
  a print driver, communicating with said document application, for converting the document in the first format into a document in a second format,
  a user interface, said user interface including a display and a user input device, and
  a browser, communicating with said user interface and said custom service, for accessing a services interface associated with said custom services, the services interface including selectable services of said custom service;
said browser, responsive to said print driver converting the document in the first format into the document in the second format, being launched so as to display the selectable services of said custom service in the services interface on said display;
said custom service, responsive to selecting, though said user input device, one of the selectable services displayed in the services interface, applying the selected selectable service to the document in the second format to form a print job;
a printer communicating with the network and corresponding with a printing destination;
said browser is apprised of the printing destination.

5. The print job processing system of claim 4, further comprising a web service, wherein information regarding the printing destination is delivered to said browser by said web service.

6. A print job processing system, comprising:
a workstation communicating with a web service by way of a network; and
a custom service communicating with the network;
said workstation including,
  a document application for creating a document in a first format,
  a print driver, communicating with said document application, for converting the document in the first format into a document in a second format,
  a user interface, said user interface including a display and a user input device, and a browser, communicating with said user interface and said custom service, for accessing a services interface associated with said custom services, the services interface including selectable services of said custom service;

said browser, responsive to said print driver converting the document in the first format into the document in the second format, being launched so as to display the selectable services of said custom service in the services interface on said display;

said custom service, responsive to selecting, though said user input device, one of the selectable services displayed in the services interface, applying the selected selectable service to the document in the second format to form a print job.

7. The print job processing system of claim 6, further comprising a file watching service communicating with the network, wherein the document in the second format is transmitted to the file watching service for buffering of the document in the second format.

8. The print job processing system of claim 7, wherein the file watching service shares the document in the second format with said custom service for applying the selected selectable service to the document in the second format.

9. The print job processing system of claim 8, wherein the file watching service is integrated with said custom service.

10. The print job processing system of claim 7, further comprising a file storage communicating with the network, wherein the document in the second format is transmitted from the file storage to the file watching service.

11. The print job processing system of claim 8, further comprising a printer communicating with the network, wherein the print job is transmitted from said custom service to said printer for printing.

12. The print job processing system of claim 6, further comprising a file watching service communicating with the network, wherein the print job is transmitted to said file watching service for buffering.

13. The print job processing system of claim 12, further comprising a printer communicating with the network, wherein the print job is transmitted from said file watching service to said printer for printing.

14. The print job processing system of claim 6, further comprising:
a printer communicating with the network and corresponding with a printing destination; and
wherein said browser is apprised of the printing destination.

15. The print job processing system of claim 14, wherein said browser is appraised with a file including a print identification.

16. The print job processing system of claim 15, wherein the file comprises a cookie.

17. The print job processing system of claim 14, wherein said browser is apprised with information stored on the network.

18. The print job processing system of claim 17, further comprising a web service, wherein said information is delivered to said browser by said web service.

19. A method of processing a print job, comprising:
A. performing the following on a workstation:
(1) creating a document in a first format,
(2) using a print driver to convert the document in the first format into a document in a second format,
(3) accessing a services interface with a browser, the services interface including selectable services available by way of the network,
(4) responsive to said A(2), opening the browser to display the selectable services of the services interface on a user interface display, and
(5) selecting one of the selectable services from the displayed services interface; and
B. responsive to A(5), causing the selected selectable service to be applied to the document in the second format to form a print job.

20. The method of claim 19, further comprising:
C. transmitting the document in the second format to a file watching service for buffering of the document in the second format.

21. The method of claim 20, further comprising:
D. transmitting the document in the second format from the file watching service to the selected selectable service for application of the selected selectable service thereto; and
E. transmitting the print job from the selected selectable service to a printer for printing.

22. The method of claim 19, further comprising:
C. transmitting the print job to a file watching service for buffering.

23. The method of claim 22, further comprising:
D. transmitting the print job from the file watching service to a printer for printing.

24. The method of claim 19, in which the workstation communicates with a printer by way of a network and the printer corresponds with a printing destination, further comprising:
C. apprising the browser of the printing destination with a file including a print identification.

25. The method of claim 19, in which the workstation communicates with a printer by way of a network and the printer corresponds with a printing destination, further comprising:
C. apprising the browser of the printing destination with information stored on the network.

* * * * *